(12) United States Patent
Byrappa et al.

(10) Patent No.: US 11,436,881 B2
(45) Date of Patent: Sep. 6, 2022

(54) SYSTEM AND METHOD FOR AUTOMATED FACE MASK, TEMPERATURE, AND SOCIAL DISTANCING DETECTION

(71) Applicant: Rockwell Collins, Inc., Cedar Rapids, IA (US)

(72) Inventors: Amith Byrappa, Mysore (IN); Abdul Wasi, Bangalore (IN); Alka Siddiqui, Hyderabad (IN)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/190,369

(22) Filed: Mar. 2, 2021

(65) Prior Publication Data

US 2022/0230492 A1 Jul. 21, 2022

(30) Foreign Application Priority Data

Jan. 19, 2021 (IN) .............................. 202141002449

(51) Int. Cl.
*A61B 5/01* (2006.01)
*G07C 9/00* (2020.01)
(Continued)

(52) U.S. Cl.
CPC ....... *G07C 9/00563* (2013.01); *G06K 9/6256* (2013.01); *G06V 20/40* (2022.01);
(Continued)

(58) Field of Classification Search
CPC .... A61B 5/01; A61B 5/00; G07C 9/10; G07C 9/00; G07C 9/21; G07C 9/22; G07C 9/25;
(Continued)

(56) References Cited

U.S. PATENT DOCUMENTS

2007/0153871 A1 7/2007 Fraden
2020/0196962 A1* 6/2020 Zhao ..................... G16H 10/60
(Continued)

FOREIGN PATENT DOCUMENTS

AU 2020102382 A4 11/2020
CN 111178333 A 5/2020
(Continued)

OTHER PUBLICATIONS

Certified Fire and Security, "Body Temperature and Mask Detection Panels", https://certfs.com/security/body-temperature-mask-detection/, Downloaded Jan. 20, 2021.
(Continued)

*Primary Examiner* — Dionne Pendleton
(74) *Attorney, Agent, or Firm* — Suiter Swantz pc llo

(57) ABSTRACT

A method for mask, temperature, and social distancing detection is disclosed. The method includes: receiving one or more images or videos from a detection device; measuring a body temperature of a passenger; performing face mask detection based on a pre-trained mask detection model and the received images or videos; and generating one or more control signals based on the measured body temperature and the performed face mask detection, the one or more control signals configured to cause the detection sub-system to grant access when the body temperature is at or below a threshold or deny access when the body temperature is above the threshold, the one or more control signals configured to cause the detection sub-system to grant access when the model detects the passenger wearing a face mask properly or deny access when the pre-trained mask detection model detects the passenger not wearing the face mask.

13 Claims, 8 Drawing Sheets

(51) Int. Cl.
*G06K 9/62* (2022.01)
*H04N 5/232* (2006.01)
*G06V 20/40* (2022.01)
*G06V 20/59* (2022.01)
*G06V 40/16* (2022.01)
*G08B 21/24* (2006.01)

(52) U.S. Cl.
CPC ............ *G06V 20/59* (2022.01); *G06V 40/171* (2022.01); *G08B 21/245* (2013.01); *H04N 5/232127* (2018.08)

(58) Field of Classification Search
CPC .......... G07C 9/32; G08B 21/04; G08B 21/24; G08B 3/10; G08B 21/0476; G08B 21/22; G08B 21/245; G08B 21/18; G06K 9/00; G06K 19/06; G01J 5/00; A61L 2/00; A61L 2/26; G06N 3/08; G06T 7/136; G06T 7/20; G16H 10/20; G16H 40/20; G16H 40/63; H02J 7/00; H04N 5/33; H04W 12/06; H04W 12/065; H04W 4/02; H04W 4/021; H04W 4/80; H04W 8/18
See application file for complete search history.

(56) References Cited

U.S. PATENT DOCUMENTS

| | | | | |
|---|---|---|---|---|
| 2020/0365002 | A1* | 11/2020 | Modiano | A61B 5/7405 |
| 2022/0012894 | A1* | 1/2022 | Lev | G06V 10/143 |

FOREIGN PATENT DOCUMENTS

| | | | |
|---|---|---|---|
| CN | 111401202 | A | 7/2020 |
| CN | 111414887 | A | 7/2020 |
| CN | 111428604 | A | 7/2020 |
| CN | 111444869 | A | 7/2020 |
| CN | 111444887 | A | 7/2020 |
| CN | 111507199 | A | 8/2020 |
| CN | 111523490 | A | 8/2020 |
| CN | 111611874 | A | 9/2020 |
| CN | 111680637 | A | 9/2020 |
| IN | 202011040861 | A | 10/2020 |
| IN | 20202105417 | A3 | 1/2021 |

OTHER PUBLICATIONS

Inamdar, Madhura et al., "Real-Time Face Mask Identification Using Facemasknet Deep Learning Network", (Jul. 29, 2020). Available at SSRN: https://ssrn.com/abstract=3663305 or http://dx.doi.org/10.2139/ssrn.3663305, Downloaded Jan. 20, 2021, 7 pages.

Jiang, Mingjie et al., "RetinaFaceMask: A Face Mask Detector", arXiv:2005.03950v2 [cs.CV] Jun. 8, 2020, https://arxiv.org/pdf/2005.03950.pdf, 9 pages.

Platinum CCTV, "Mask Detecting Thermal Skin Temperature Access Control Camera Panel", https://platinumcctv.com/thermal-access-camera, Downloaded Jan. 20, 2021.

Sathyamoorthy, A.J. et al., "COVID-Robot: Monitoring Social Distancing Constraints in Crowded Scenarios", arXiv:2008.06585v2 [cs.RO] Aug. 21, 2020, https://arxiv.org/pdf/2008.06585.pdf, 11 pages.

Vehant Technologies, "FebriEyeTM (H & EL)—AI-based Thermal Temperature Monitoring System", https://www.vehant.com/products-solutions/covid-management-analytics/febrieye, Downloaded Jan. 20, 2021.

* cited by examiner

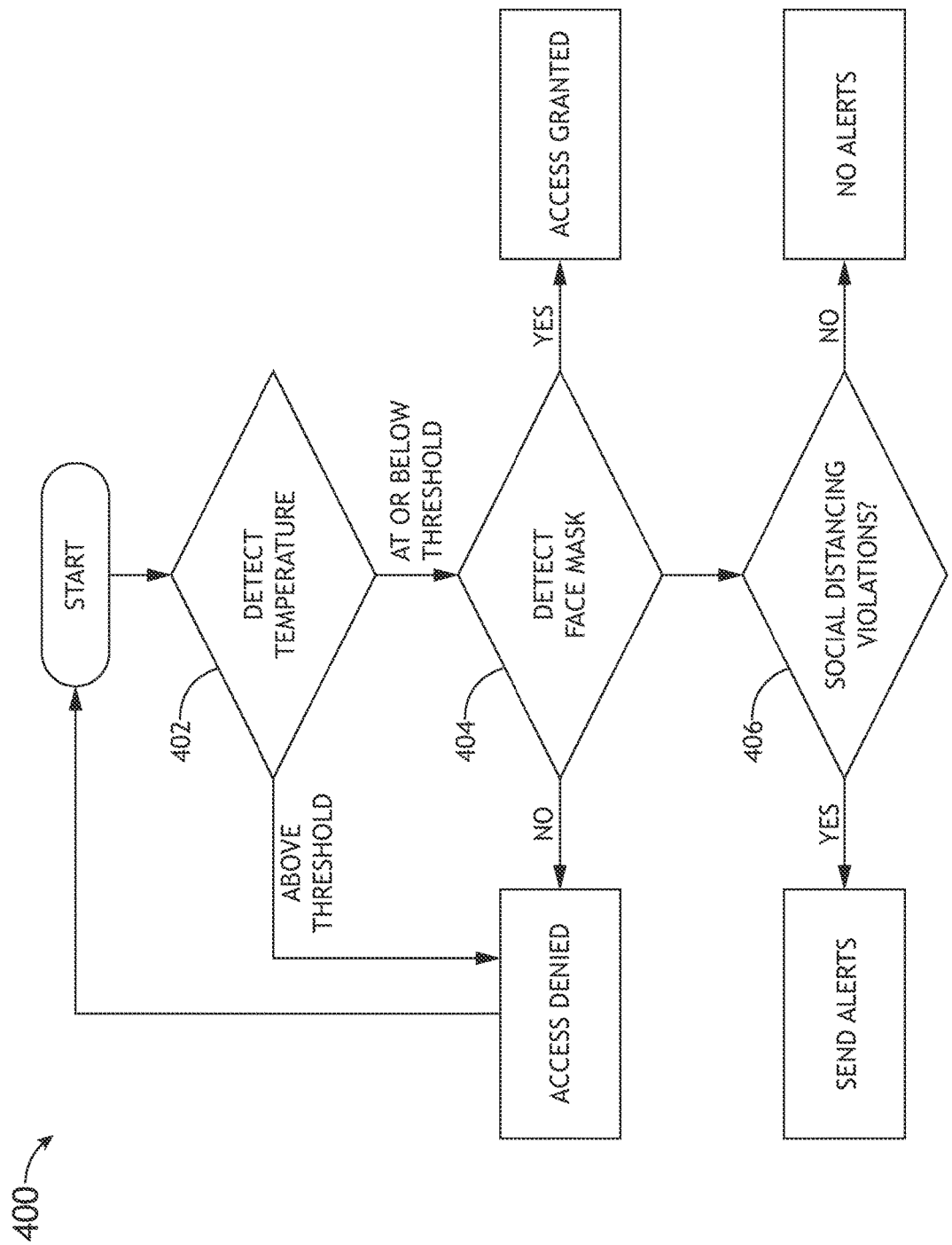

SYSTEM AND METHOD FOR AUTOMATED FACE MASK, TEMPERATURE, AND SOCIAL DISTANCING DETECTION

CROSS-REFERENCE TO RELATED APPLICATIONS

The present application claims the benefit of India Provisional Patent Application No. 202141002449, filed Jan. 19, 2021, entitled AUTOMATED FACE MASK, TEMPERATURE, AND SOCIAL DISTANCING DETECTION SYSTEM AND METHOD, naming Amith Byrappa Mysore, Abdul Wasi, and Alka Siddiqui as inventors, which is incorporated by reference in the entirety.

BACKGROUND

In the wake of the coronavirus (COVID-19) pandemic, it has become highly essential for airlines to ensure safety protocols are maintained at airports. The risk of contracting the virus is increased if the safety protocols are not followed. Therefore, there is need for a solution which helps the airport authorities to monitor such safety protocols.

SUMMARY

A system for automated safety protocol detection is disclosed, in accordance with one or more embodiments of the present disclosure. In one embodiment, the system includes a detection sub-system comprising one or more detection devices configured to capture at least one of one or more images or one or more videos of one or more passengers. In another embodiment, the system includes one or more controllers communicatively coupled to the detection sub-system, the one or more controllers including one or more processors configured to execute a set of program instructions stored in memory, the one or more controllers including a pre-trained detection model stored in the memory, the set of program instructions configured to cause the one or more processors to: receive the at least one of the one or more images or the one or more videos from the one or more detection devices of the detection sub-system; measure a body temperature of a passenger of the one or more passengers using a first detection device of the one or more detection devices; perform face mask detection based on the pre-trained mask detection model and the received at least one of the one or more images or the one or more videos using an additional detection device of the one or more detection devices; and generate one or more control signals based on the measured body temperature and the performed face mask detection, the one or more control signals configured to cause the detection sub-system to grant access when the measured body temperature is at or below a predetermined body temperature threshold or configured to cause the detection sub-system to deny access when the measured body temperature is above the predetermined body temperature threshold, the one or more control signals configured to cause the detection sub-system to grant access when the pre-trained mask detection model detects the passenger wearing a face mask over the passenger's nose and chin or configured to cause the detection sub-system to deny access when the pre-trained mask detection model detects the passenger not wearing the face mask over the passenger's nose and chin.

In some embodiments, the perform face mask detection based on the pre-trained mask detection model and the received at least one of the one or more images or the one or more videos using an additional detection device of the one or more detection devices may comprise of: extracting one or more face regions of interest from the received at least one of the one or more images or the one or more videos; applying a mask classifier of the pre-trained detection model to determine whether the passenger is wearing the face mask; and applying the mask classifier of the pre-trained detection model to determine whether the passenger is wearing the face mask over the passenger's nose and chin.

In some embodiments, the one or more face regions of interest may include at least one of: a first eye region, a second eye region, a first lip region, a second lip region, or a nose region.

In some embodiments, the one or more controllers may be further configured to perform social distancing detection based on the received at least one of the one or more images or the one or more videos using the additional detection device of the one or more detection devices.

In some embodiments, the perform social distancing detection based on the received at least one of the one or more images or the one or more videos using the additional detection device of the one or more detection devices may comprise of: determining a first focal plane of a passenger based on the received at least one of the one or more images or the one or more videos; determining an additional focal place an additional passenger based on the received at least one of the one or more images or the one or more videos; calculating the distance between the first focal plane and the second focal plane; and generating one or more control signals based on the calculated distance.

In some embodiments, the system may further comprise one or more audio devices.

In some embodiments, the one or more control signals may be configured to cause the one or more audio devices to play an alert if the calculated distance is below a predetermined social distancing threshold.

In some embodiments, the predetermined social distancing threshold may be 6 feet.

In some embodiments, the first image detection device may include a thermal imaging device.

In some embodiments, the additional detection device may include a camera.

In some embodiments, a controller of the one or more controllers may be integrated into the detection sub-system.

In some embodiments, the detection sub-system is a kiosk.

In some embodiments, a controller of the one or more controllers may be external to the detection sub-system.

In some embodiments, the predetermined body temperature threshold may be 100° F.

A method for automated safety protocol detection is disclosed, in accordance with one or more embodiments of the present disclosure. In one embodiment, the method includes, but is not limited to, receiving at least one of one or more images or one or more videos from one or more detection devices. In another embodiment, the method includes, but is not limited to, measuring a body temperature of a passenger using a first detection device of the one or more detection devices. In another embodiment, the method includes, but is not limited to, performing face mask detection based on a pre-trained mask detection model and the received at least one of the one or more images or the one or more videos using an additional detection device of the one or more detection devices. In another embodiment, the method includes, but is not limited to, generating one or more control signals based on the measured body temperature and the performed face mask detection, the one or more control signals configured to cause the detection sub-system to grant access when the measured body temperature is at or below a predetermined body temperature threshold or configured to cause the detection sub-system to deny access when the measured body temperature is above the predetermined body temperature threshold, the one or more control signals configured to cause the detection sub-system to grant access when the pre-trained mask detection model detects the passenger wearing a face mask over the passenger's nose and chin or configured to cause the detection sub-system to deny access when the pre-trained mask detection model detects the passenger not wearing the face mask over the passenger's nose and chin.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 4 illustrates a flowchart depicting a method or process for using the system for automated face mask, temperature, and social distancing detection, in accordance with one or more embodiments of the disclosure.

DETAILED DESCRIPTION OF THE INVENTION

Figure 1:
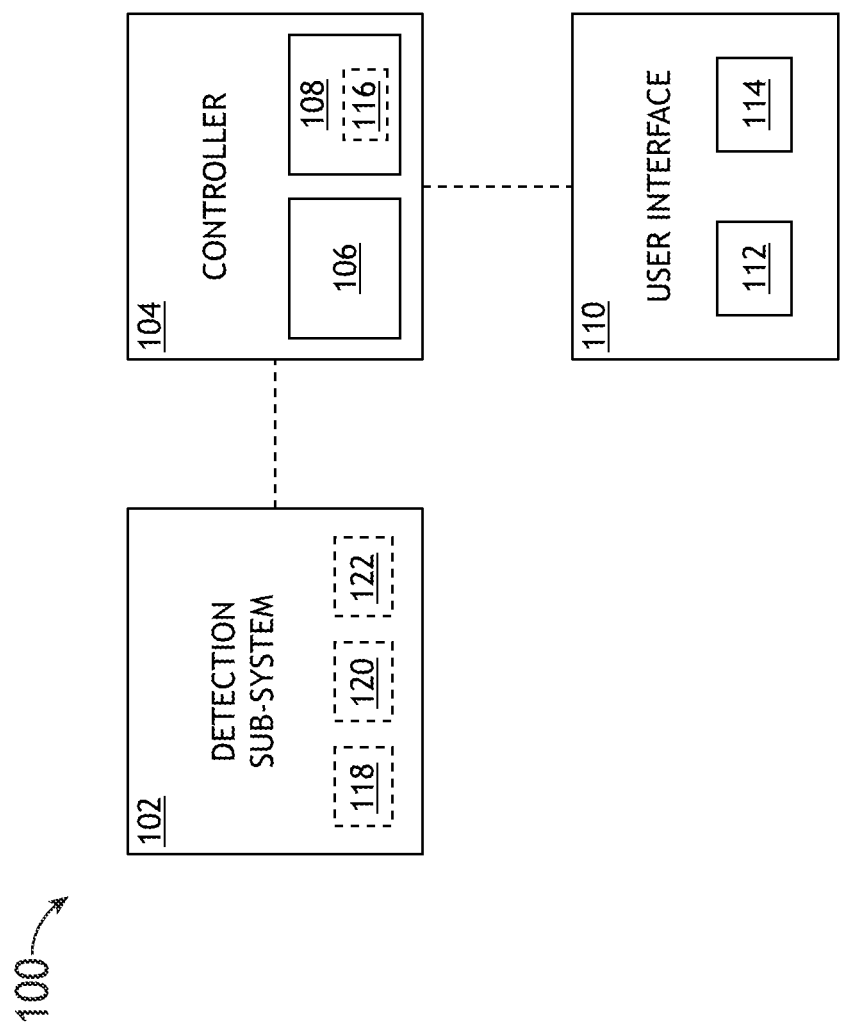
FIG. 1 illustrates a simplified block diagram of a system for automated face mask, temperature, and social distancing detection, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

In the wake of the coronavirus (COVID-19) pandemic, it has become highly essential for airlines to ensure safety protocols are maintained at airports. For example, it is essential that airlines monitor face mask usage (e.g., wearing a mask and wearing the mask correctly), monitoring passengers' body temperatures, and monitoring social distancing protocols (e.g., staying 6 feet away from other passengers). The risk of contracting the virus is increased if the safety protocols are not followed. Therefore, there is need for a solution which helps the airport authorities to monitor such safety protocols.

Currently, there are manual temperature checks being carried out at the airport. In some instances, there are automatic temperature checks being carried out at the airport. However, the face mask safety protocol as per the guidelines is rarely checked (manually and/or automatically).

Embodiments of the present disclosure are directed to a system and method for an artificial intelligence based touchless system configured to scan airport staff and passengers while entering various airport premises (e.g., baggage, security, boarding, or the like). In this regard, airport staff and passengers are only permitted to enter if are adhering to the Safety Guidelines. For example, airport staff and passengers are only permitted if: (a) they are wearing a face mask; (b) the face mask is being worn properly (e.g., over the nose and chin); and (c) their body temperature is below a predetermined threshold (e.g., below approximately 100° F.). Further, the system may be configured to determine whether the airline staff/passenger members are following proper social distancing requirements (e.g., maintaining a 6 feet distance between other individuals) at the time the system is detecting face mask usage and body temperature. If the individual fails to meet one of the above mentioned Safety Guidelines, then the system may be configured to alert the individual that they did not meet at least one of the required criteria and will not be granted entry (at least until the failed criteria is met).

FIG. 1 illustrates a simplified block diagram of the system 100 for automated face mask, temperature, and social distancing detection, in accordance with one or more embodiments of the present disclosure. The system 100 may include, but is not limited to, a detection sub-system 102. The system 100 may additionally include, but is not limited to, one or more controllers 104 including one or more processors 106, memory 108, and a user interface 110.

Figure 2:
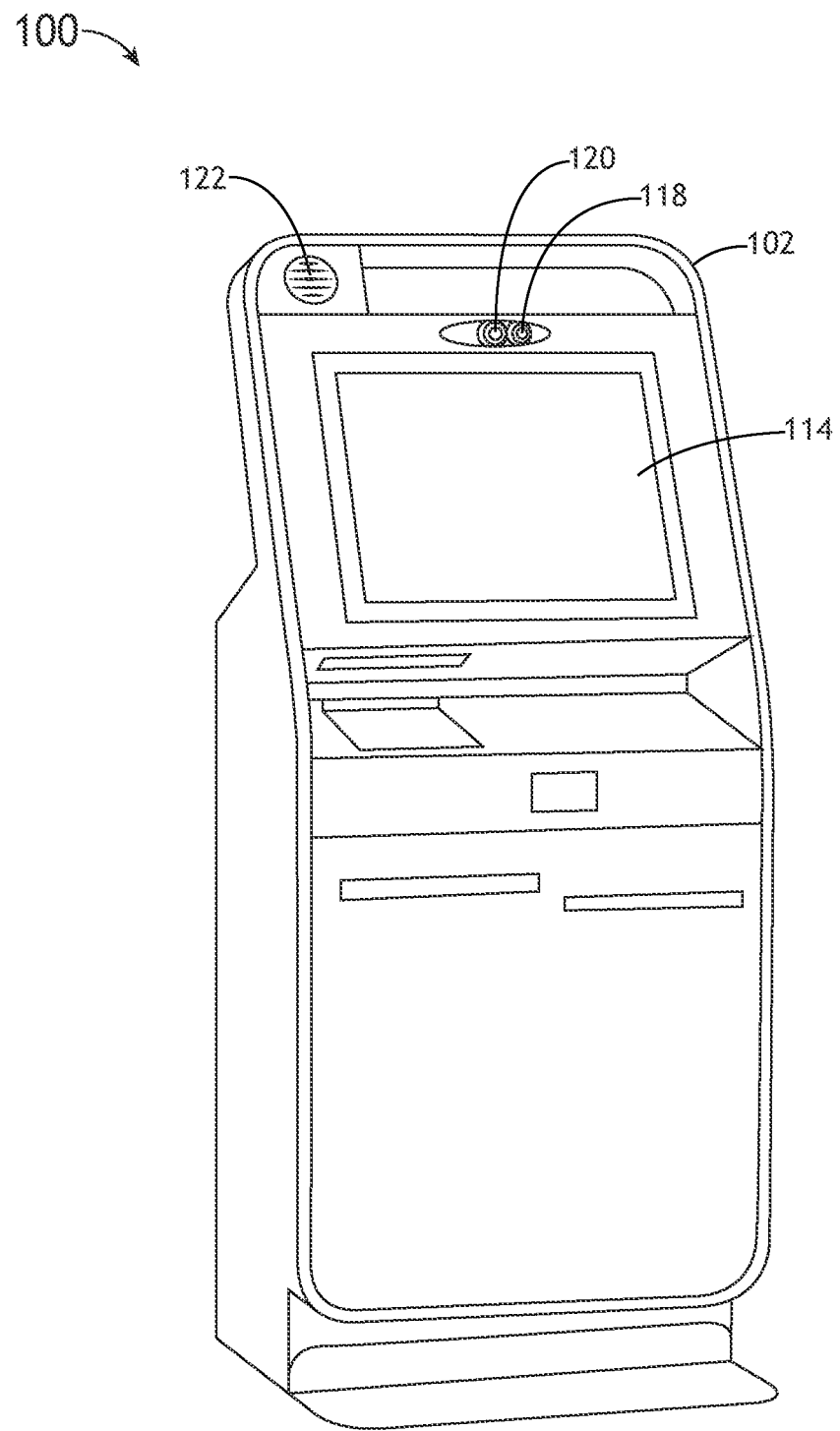
FIG. 2 illustrates a simplified schematic of an example detection device of the system for automated face mask, temperature, and social distancing detection, in accordance with one or more embodiments of the disclosure.

The detection sub-system 102 may include any detection sub-system configured to perform at least one of face mask detection, body temperature detection, and/or social distancing detection. For example, as shown in FIG. 2, the detection sub-system 102 may include a kiosk 102. For instance, the system may include an airline check-in kiosk, such as the kiosk shown in FIG. 2. It is noted that the kiosk shown in FIG. 2 is provided merely for illustrative purposes and shall not be construed as limiting the scope of the present disclosure.

By way of another example, the detection sub-system 102 may include a user device. For example, the detection sub-system 102 may include a smartphone, tablet, desktop computer, laptop computer, or the like.

It is noted that the detection sub-system 102 may include any type of detection sub-system and be used at any location within (or outside) a transportation center (e.g., airport, train station, subway station, or the like). For example, the detection sub-system 102 may be placed before the entrances to the transportation center. By way of another example, the detection sub-system 102 may be placed near the security line. By way of another example, the detection sub-system 102 may be placed in the gate/boarding area.

The one or more controllers 104 may be communicatively coupled to the detection sub-system 102. In this regard, one or more processors 106 of the one or more controllers 104 may be configured to generate one or more control signals to cause the detection sub-system 102 to carry out various steps of the present disclosure.

It is noted that the one or more controllers 104 may be housed in a common housing of the detection sub-system 102 or housed external to the detection sub-system 102. As such, FIGS. 1-2 are provided merely for illustrative purposes and shall not be construed as limiting the scope of the present disclosure.

The detection sub-system 102 may include a plurality of detection devices. communicatively coupled to the one or more controllers 104. It is noted that the plurality of detection devices may be housed in a common housing of the detection sub-system 102 or housed external to the detection sub-system 102. For example, at least one of the plurality of detection devices may be housed within the detection sub-system 102. By way of another example, at least one of the plurality of detection devices may be housed external to the detection sub-system 102. It is noted that the detection sub-system 102 may be coupled to the plurality of detection devices via one or more wired or wireless connections.

The plurality of image detection devices may include a first detection device 118 configured to perform body temperature detection. For example, the first detection device 118 may include a body temperature detection device 118 configured to measure the body temperature of a passenger. For instance, the body temperature detection device 118 may include a thermal camera configured to measure the body temperature of the passenger. It is noted that the body temperature detection device 118 may include any type of thermal detection device suitable for measuring the body temperature of the passenger such as, but not limited to, a thermal imaging camera (e.g., a Seek camera).

The plurality of devices may further include an additional detection device 120 configured to perform at least one of face mask detection or social distancing detection. For example, the additional detection device 120 may include a face mask detection device. By way of another example, the additional detection device 120 may include a social distancing detection device. Although FIG. 1 depicts the additional detection device 120 as a single device configured to perform facial recognition for both face mask detection and social distancing detection, it is noted that the facial detection device and the social distancing detection device may be separate devices. Further, although FIG. 1 illustrates the first detection device 118 and the additional detection device 120 as separate devices, it is noted that the first detection device 118 may be configured to perform body temperature detection, as well as, face mask and social distancing detection.

The additional detection device 120 may include a camera configured to capture one or more images of one or more individuals positioned a select distance from the system. For example, the additional detection device 120 may be configured to capture one or more images to determine whether or not the individuals are practicing proper social distancing requirements (e.g., maintaining a 6 feet distance between them) based on the captured images from the camera. By way of another example, the additional detection device 120 may be configured to capture one or more images to determine whether or not the individuals are practicing proper face mask requirements (e.g., wearing a mask over the individuals' nose and chin) based on the captured images from the camera.

The camera may further be configured to record one or more videos (e.g., livestream videos) of one or more individuals positioned a select distance from the system. For example, the additional detection device 120 may be configured to record one or more videos to determine whether or not the individuals are practicing proper social distancing requirements (e.g., maintaining a 6 feet distance between them) based on the record video feed from the camera. By way of another example, the additional detection device 120 may be configured to record one or more videos to determine whether or not the individuals are practicing proper face mask requirements (e.g., wearing a mask over the individuals' nose and chin) based on the record video feed from the camera.

The system may further include one or more audio devices 122 (e.g., speakers). The one or more audio devices 122 (e.g., speakers) may be configured to alert the passenger that they have not met one or more of the safety protocols. For example, the one or more audio devices 122 may be configured to alert the passenger that they are not following proper social distancing requirements. For instance, if the passenger is not maintaining a 6 feet distance between them and another passenger, the system 100 may be configured to alert the individual, via the one or more audio devices 122, that the individual needs to stand at least 6 feet away from another individual. By way of another example, the one or more audio devices 122 may be configured to alert the individual that their body temperature is above a predetermined threshold (e.g., above approximately 100° F.). By way of another example, the one or more audio devices 122 may be configured to alert the individual that they are not wearing a face mask and/or the mask is being worn improperly (e.g., not over the individuals' nose and chin). By way of another example, the one or more audio devices 122 may be configured to alert the individual that access is granted (e.g., the safety protocols have all been met).

Although FIG. 1 depicts the audio device 122 being housed within the detection sub-system 102, it is noted that the audio device 122 may be housed external to the detection sub-system 102. For example, the audio device 122 may be communicatively coupled to the detection sub-system 102 via one or more wired or wireless means.

As noted previously herein, the one or more controllers 104 of the system 100 may include one or more processors 106 and memory 108. The memory 108 may include one or more program instructions configured to cause the one or more processors 106 of carry out various steps of the present disclosure. For example, the program instructions may be configured to cause the one or more processors 106 to perform at least one of face mask detection, body temperature detection, and/or social distancing detection.

The system 100 may include a detection model 116 configured to perform face mask detection. For example, the one or more controllers 104 may include a detection model 116 stored in memory 108. For instance, the detection model 116 may be trained to perform face mask detection (as discussed further herein with respect to FIG. 5) and the trained detection model 116 may be stored in memory 108. In this regard, the system 100 may be configured to perform face mask detection using the pre-trained detection model 116 while at least contemporaneously or simultaneously performing body temperature detection and social distancing detection. It is noted herein that utilizing the pre-trained detection model 116 allows for faster face mask detection, further it allows the system to simultaneously detect other safety protocols (e.g., temperature and social distancing detection).

The system 100 may further include a user interface 110 communicatively coupled to the one or more controllers 104. The user interface 110 may include a user input device 112 and a display 114. The user input device 112 may be configured to receive one or more input commands from a user, the one or more input commands may be configured to input data into the system.

Figure 3A:
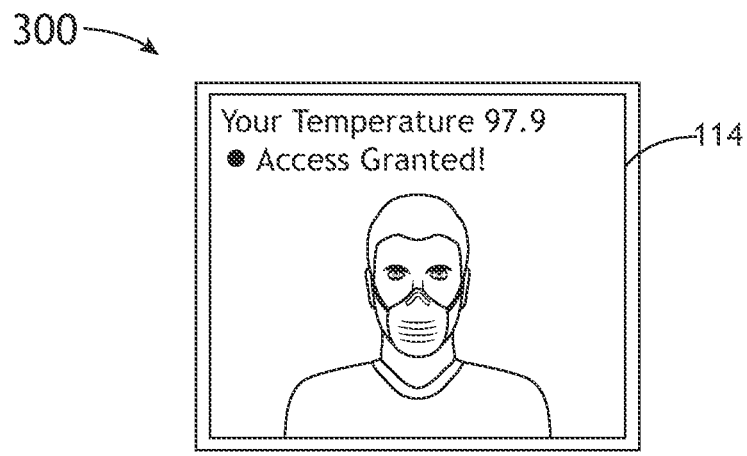
FIG. 3A illustrates a simplified schematic of a user display device of the system for automated face mask, temperature, and social distancing detection, in accordance with one or more embodiments of the disclosure.
Figure 3B:
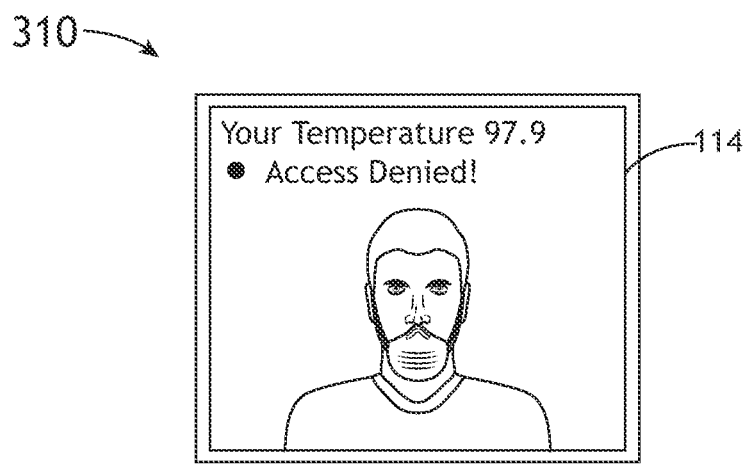
FIG. 3B illustrates a simplified schematic of a user display device of the system for automated face mask, temperature, and social distancing detection, in accordance with one or more embodiments of the disclosure.
Figure 3C:
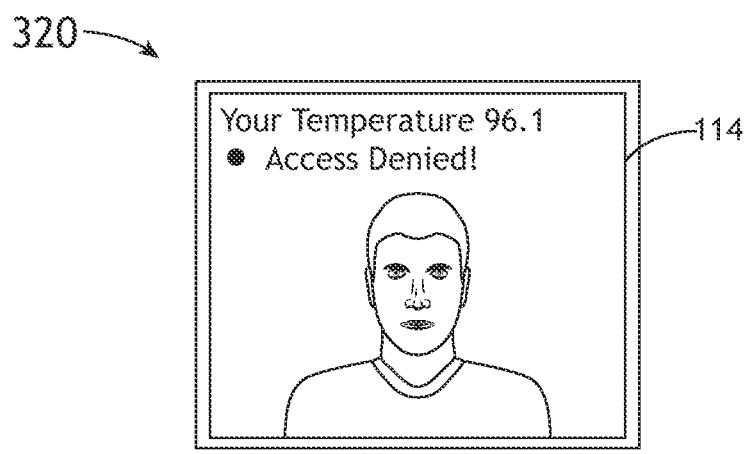
FIG. 3C illustrates a simplified schematic of a user display device of the system for automated face mask, temperature, and social distancing detection, in accordance with one or more embodiments of the disclosure.

FIGS. 3A-3C illustrate example display screens of the display 114, in accordance with one or more embodiments of the disclosure. In particular, FIG. 3A illustrates an example display screen 300. In particular, FIG. 3B illustrates an example display screen 310. In particular, FIG. 3C illustrates an example display screen 320.

The display 114 may be configured to display data of the system 100 to a user. For example, as shown in FIGS. 3A-3C, the display 114 may be configured to display the measured body temperature of the individual. By way of another example, as shown in FIGS. 3A-3C, the display 114 may be further configured to display the results of the safety protocol detection (e.g., whether access is denied or granted).

It is noted herein that the one or more components of system 100 may be communicatively coupled to the various other components of system 100 in any manner known in the art. For example, the one or more processors 106 may be communicatively coupled to each other and other components via a wireline (e.g., copper wire, fiber optic cable, and the like) or wireless connection (e.g., RF coupling, IR coupling, WiMax, Bluetooth, 3G, 4G, 4G LTE, 5G, and the like). By way of another example, the controller 104 may be communicatively coupled to one or more components of detection sub-system 102 via any wireline or wireless connection known in the art.

The one or more processors 106 may include any one or more processing elements known in the art. In this sense, the one or more processors 106 may include any microprocessor device configured to execute algorithms and/or program instructions. In general, the term "processor" may be broadly defined to encompass any device having one or more processing elements, which execute a set of program instructions from a non-transitory memory medium (e.g., the memory 108), where the one or more sets of program instructions are configured to cause the one or more processors 106 to carry out any of one or more process steps.

The memory 108 may include any storage medium known in the art suitable for storing the one or more sets of program instructions executable by the associated one or more processors 106. For example, the memory 108 may include a non-transitory memory medium. For instance, the memory 108 may include, but is not limited to, a read-only memory (ROM), a random access memory (RAM), a magnetic or optical memory device (e.g., disk), a magnetic tape, a solid state drive, and the like. The memory 108 may be configured to provide display information to the user device 110. In addition, the memory 108 may be configured to store user input information from one or more user input devices. The memory 108 may be housed in a common controller housing with the one or more processors 106. The memory 108 may, alternatively or in addition, be located remotely with respect to the spatial location of the processors 106 and/or the one or more controllers 104. For instance, the one or more processors 106, the one or more controllers 104 may access a remote database, accessible through a network (e.g., internet, intranet, and the like) via one or more communication interfaces.

The one or more communication interfaces may be operatively configured to communicate with one or more components of the one or more controllers 104 and/or the one or more components of the system. For example, the one or more communication interfaces may also be coupled (e.g., physically, electrically, and/or communicatively) with the one or more processors 106 to facilitate data transfer between components of the one or more components of the one or more controllers 104 and/or the one or more components of the system 100 and the one or more processors 106. For instance, the one or more communication interfaces may be configured to retrieve data from the one or more processors 106, or other devices, transmit data for storage in the memory 108, retrieve data from storage in the memory 108, or the like.

In one embodiment, a user interface 110 is communicatively coupled to the controller 104. In one embodiment, the user interface 110 may include, but is not limited to, one or more desktops, tablets, smartphones, smart watches, or the like. In another embodiment, the user interface 110 includes a display 114 used to display data of the system 100 to a user. The display 114 of the user interface 110 may include any display known in the art. For example, the display 114 may include, but is not limited to, a liquid crystal display (LCD), an organic light-emitting diode (OLED) based display, or a CRT display. Those skilled in the art should recognize that any display device capable of integration with a user interface 110 is suitable for implementation in the present disclosure. In another embodiment, a user may input selections and/or instructions responsive to data displayed to the user via a user input device of the user interface 110.

FIG. 4 illustrates a high-level simplified flowchart depicting a method or process 400 for using the pre-trained system 100, in accordance with one or more embodiments of the present disclosure.

In a step 402, the system 100 may be configured to measure the individual's body temperature. For example, the body temperature detection device 118 may be configured to measure the individual's body temperature and provide the measurement to the one or more controllers 104. The one or more controllers 104 may be configured to determine whether the measured body temperature meets the safety protocols based on a predetermined body temperature threshold stored in memory 108. For example, if the temperature is at or below a predetermined threshold, the one or more controllers 104 may determine that the body temperature meets the safety protocols and grant access. By way of another example, if the temperature is above a predetermined threshold, the one or more controllers 104 may determine that the individual should not be granted access and thus determine that access/entry is denied. The display device of the system may be configured to display the results, as shown in FIGS. 3A-3C.

In a step 404, the system 100 may be configured to determine whether the individual is wearing a face mask and whether the face mask is worn properly (e.g., over the nose and chin). For example, the one or more controllers 104 may be configured to determine whether the individual is wearing a face mask and whether the face mask is worn properly (e.g., over the nose and chin), as discussed further herein. If the individual is wearing a mask and it is being worn properly then access may be granted. However, if the individual is not wearing a mask or the mask is being worn improperly then access may be denied. The display 114 of the system may be configured to display the results, as shown in FIGS. 3A-3C.

It is noted herein that the predetermined temperature may include any temperature threshold. For example, the temperature threshold may be 100° F., such that access is granted if the temperature is below 100° F. By way of another example, the temperature threshold may be 98.6° F. The threshold may be determined by the Center for Disease Control and Prevention (CDC), other public health institutes, the transportation center (e.g., airport, train station, subway station, or the like), or the like.

In a step 406, the system 100 may be further configured to perform social distancing detection. For example, the one or more controllers 104 may be configured to determine whether or not there is a predetermined distance between a first individual and an additional individual. If the distance between the first individual and the additional individual is less than the predetermined distance (e.g., 6 feet) then the one or more controllers 104 may generate one or more control signals to cause the audio device 122 to play an alert. If the distance between the first individual and the additional individual is greater than or equal to the predetermined distance (e.g., 6 feet) then no alert may be played.

Further it is noted herein that the one or more safety protocols may be determined by the Center for Disease Control and Prevention (CDC), other public health institutes, the airport, or the like. For example, the social distancing requirement of 6 feet may be adjusted based on the guidelines of the above entities. By way of another example, the proper way to wear a face mask and any associated face mask protocols may be adjusted based on the guidelines of the above entities. The provided safety protocols are provided merely for illustrative purposes and should not be construed as limiting the scope of the present disclosure.

It is noted that one or more steps 402-406 may be combined in a single step (e.g., performed simultaneously). For example, the system 100 may be configured to perform face mask detection and temperature detection in a single step and perform social distancing detection in a separate step. By way example, the system 100 may be configured to perform face mask detection, temperature detection, and social distancing detection in a single step.

Figure 5:
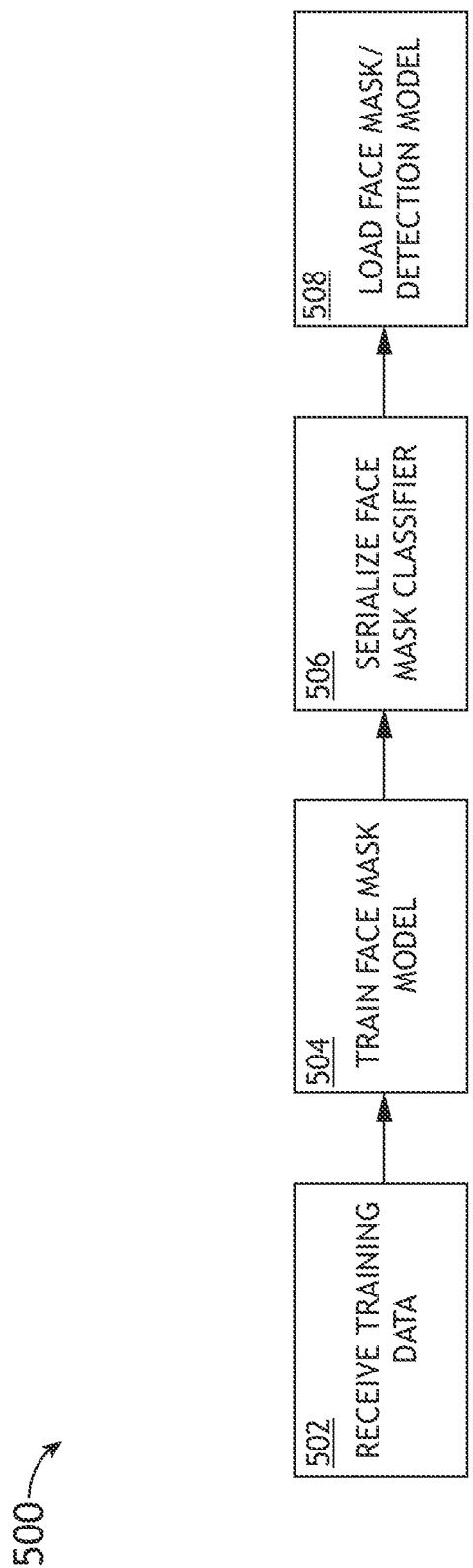
FIG. 5 illustrates a flowchart depicting a method or process for training a face mask detection model of the system for automated face mask, temperature, and social distancing detection, in accordance with one or more embodiments of the disclosure.

FIG. 5 illustrates a flowchart depicting a method or process 500 for training a detection model 116 of the system 100, in accordance with one or more embodiments of the present disclosure.

In a step 502, the system 100 may be configured to receive training data. The training data may include a plurality of training images. For example, the system 100 may be configured to receive a plurality of training images to train the detection model 116. It is noted that the plurality of training images may include any number and type of examples, such that the face mask detection model may accurately determine whether or not an individual is wearing a mask and whether or not the mask is being worn correctly. For example, the system may train the classifier using 2000+ images.

Further, it is noted that the plurality of training images may include any type of examples, such that the face mask detection model may accurately determine whether or not an individual is wearing a mask and whether or not the mask is being worn correctly. For example, the plurality of training images may include one or more images of individuals wearing a variety of masks properly (e.g., over the nose and chin). By way of another example, the plurality of training images may include one or more images of individuals wearing a variety of masks improperly (e.g., not over the nose and chin). By way of another example, the plurality of training images may include one or more images of individuals wearing no face mask.

By way of another example, the plurality of training images may include one or more images of individuals with facial hair (e.g., beard, mustache, or the like) wearing a variety of masks. In one instance, the plurality of training images may include one or more images of individuals with facial hair wearing a dark-colored mask. In this regard, the face mask detection model may be trained to distinguish an individual's facial hair from a dark-colored mask.

By way of another example, the plurality of training images may include one or more images of individuals using their hand and/or other object to cover their nose and chin area. In this regard, the system may be configured to distinguish between a hand and/or other object and a face mask.

In a step 504, the system 100 may be configured to train the face mask detection model 116 using the plurality of training images. For example, the face mask detection model 116 may include a mask classifier configured to be trained using the plurality of training images. It is noted herein that the mask classifier may be trained using any machine learning or deep learning technology. For example, the classifier may be built on the trained data set using a convolutional neural network such as, but not limited to Keras, Tensorflow, or the like.

In an optional step, the system 100 may be configured to perform one or more image processing steps. For example, the system 100 may be configured to prepare the plurality of images for training using the one or more image processing steps. For example, the plurality of images may be resized prior to training the mask classifier. By way of another example, the plurality of images may be converted to an array format prior to training the mask classifier. By way of another example, the plurality of images may be split into a train set and a test set using random sampling. For instance, random sampling may be configured to split approximately 80% of the plurality of images into a train set and approximately 20% of the plurality of images into a test set.

In a step 506, the system 100 may be configured to serialize the mask classifier. It is noted herein that the system may be configured to perform any serialization method known in the art.

In a step 508, the trained face mask detection model may be loaded. For example, the face mask detection model may be stored in memory 108 on the one or more controllers 104 of the system 100.

Figure 6:
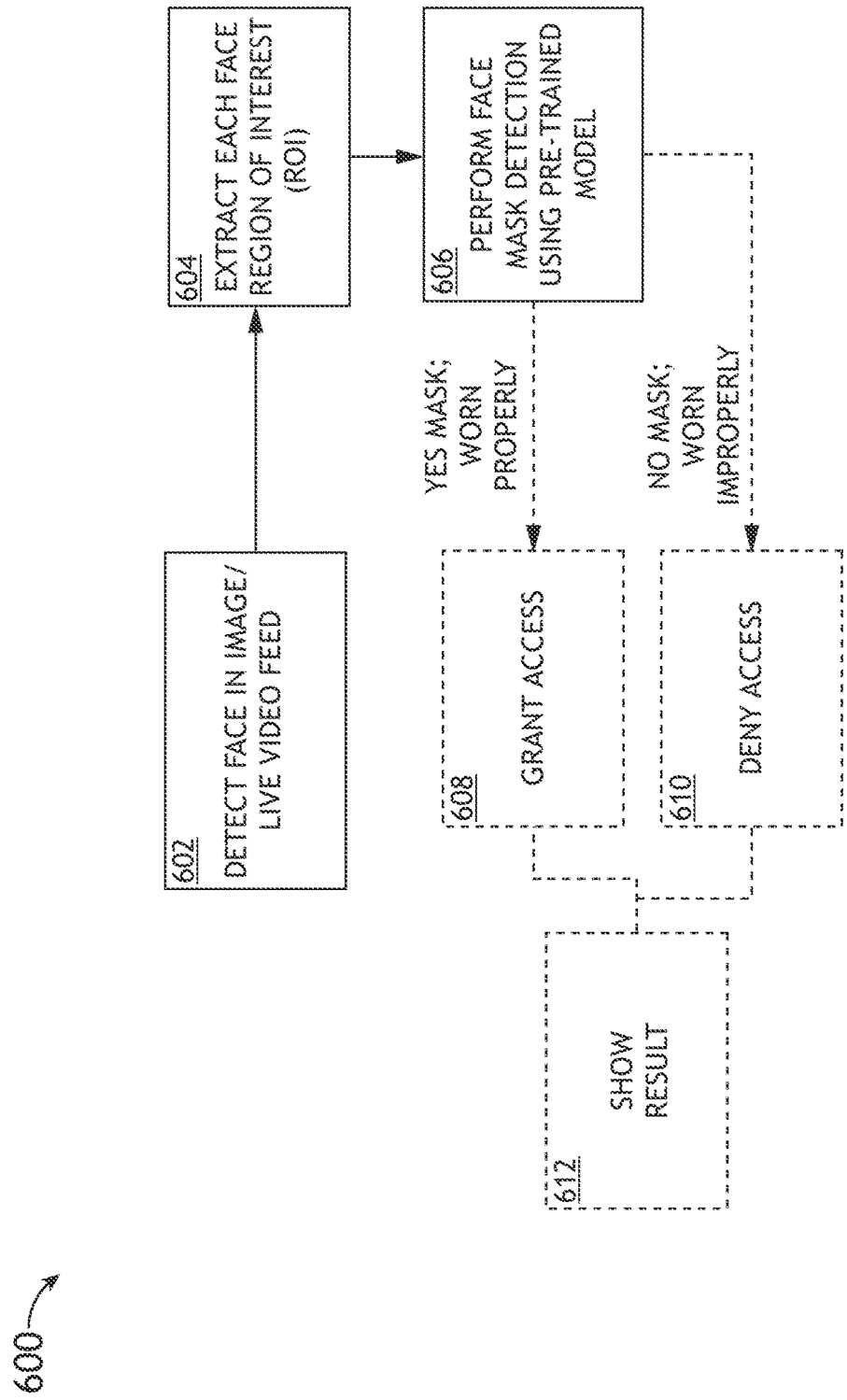
FIG. 6 illustrates a flowchart depicting a method or process for using the pre-trained system for automated face mask detection, in accordance with one or more embodiments of the disclosure.

FIG. 6 illustrates a flowchart depicting a method or process 600 for face mask detection using the mask detection model 116 of the system 100, in accordance with one or more embodiments of the disclosure.

In a step 602, the system 100 may be configured to receive an image/video feed to detect a face in the feed. For example, the one or more controllers 104 may be configured to receive one or more images or livestream videos from the plurality of detection devices. For instance, the one or more controllers 104 may be configured to receive one or more images or videos from the additional detection device 120 (e.g., the camera). In this regard, the additional detection device 120 may be configured to capture/record one or more images or videos of a passenger positioned a select distance from the detection sub-system 102, such that the system 100 may be configured to perform face mask detection for that particular passenger to grant/deny the passenger entry into the specified area.

In an optional step, the system 100 may be configured to convert the one or more images or videos into Base 64 encoded string. The converted images may be provided to a Flask API. The Flask API may be configured to convert the Base 64 string into an image and run the image against the face detection model.

In a step 606, one or more face regions of interest (ROIs) may be extracted from the one or more images or videos. For example, the one or more controllers 104 may be configured to extract each face ROI from the received images/videos. The face Net model may be used to detect the face in the image/video feed and create the region of interest.

It is noted that any number of ROIs may be used by the system to detect a face mask. For example, the system may utilize a plurality of ROIs such as, but not limited to, a first eye region, a second eye region, a first lip region, a second lip region, and nose region, or the like. In one instance, the system may utilize the first eye region and the second eye region (e.g., a first eye and a second eye) to determine whether or not the regions are covered. In another instance, the system may utilize the first lip region and the second lip region (e.g., a first end of the lips and a second end of the lips) to determine whether or not the regions are covered. In another instance, the system may utilize the nose region (e.g., a nose tip) to determine whether or not the regions are covered. In this regard, during face mask detection, if the eye regions are not covered, the nose tip is covered, and the lip regions are covered, the system may determine that a face mask has been detected and is being worn properly.

In a step 608, the system 100 may be configured to perform face mask detection using the pre-trained detection model 116. For example, the one or more controllers 104 may be configured to apply the mask classified of the model 116 to determine whether the individual is wearing a face mask and whether the face mask is being worn properly (e.g., over nose and chin). Upon satisfying the face mask requisite conditions, the Flask API may be configured to convert the image back into the JavaScript Object Notation (JSON) format and provide the JSON Output to the controller of the system.

If a face mask is detected and it is worn properly, in a step 608, the system 100 may be configured to grant access (if other required safety protocols are met). For example, the one or more controllers 104 may be configured to generate one or more control signals to cause a display device to indicate access is granted (step 612). By way of another example, the one or more controllers 104 may be configured to generate one or more control signals to cause the system 100 to alert the individual (or airport personnel), via the audio device 122, that access is granted.

If a face mask is detected and it is not worn properly, in a step 610, the system 100 may be configured to deny access. For example, the one or more controllers 104 may be configured to generate one or more control signals to cause a display device to indicate access is denied (step 612). By way of another example, the one or more controllers 104 may be configured to generate one or more control signals to cause the system 100 to alert the individual (or airport personnel), via the audio device 122, that access is denied.

In some embodiments, the one or more controllers 104 may be communicatively coupled to one or more components of an access point (e.g., gate, door, security system), such that the one or more controllers 104 may be configured to grant/deny access to the access point based on whether or not the face mask requirement has been met (or another safety protocol has been met). For example, the one or more controllers 104 may be communicatively coupled to an entry gate/door. In this example, when access is granted, the one or more controllers 104 may be configured to allow access via the entry gate/door (e.g., by unlocking the gate/door, opening the gate/door, or the like). Further, in this example, when access is denied, the one or more controllers 104 may be configured to deny access via the entry gate/door (e.g., by locking the gate/door, or the like).

Figure 7:
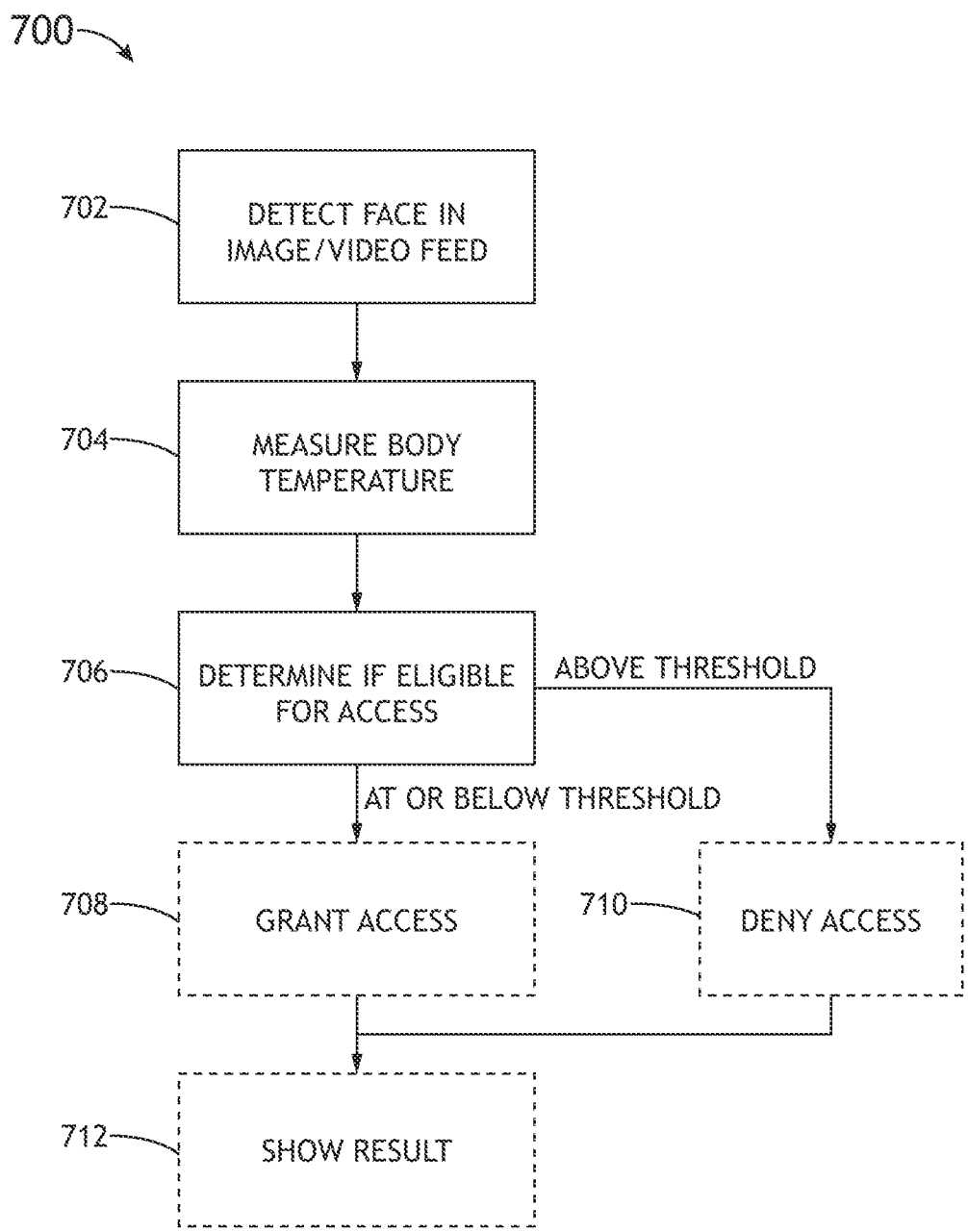
FIG. 7 illustrates a flowchart depicting a method or process for using the pre-trained system for temperature detection, in accordance with one or more embodiments of the disclosure.

FIG. 7 illustrates a flowchart depicting a method or process 700 for body temperature detection, in accordance with one or more embodiments of the disclosure.

In a step 702, the system 100 may be configured to receive one or more images (or videos). For example, the one or more controllers 104 may be configured to receive one or more images (or videos) from the body temperature detection device 118. The one or more images (or videos) may include one or more thermal images.

In a step 704, the system 100 may be configured to determine whether the measured body temperature meets the safety protocol requirements.

If the measured body temperature is at or below the predetermined body temperature threshold, in a step 708, the system 100 may be configured to grant access (if other required safety protocols are met). For example, the one or more controllers 104 may be configured to generate one or more control signals to cause a display device to indicate access is granted (step 712). By way of another example, the one or more controllers 104 may be configured to generate one or more control signals to cause the system 100 to alert the individual (or airport personnel), via the audio device 122, that access is granted.

If the measured body temperature is above the predetermined body temperature threshold, in a step 710, the system 100 may be configured to deny access. For example, the one or more controllers 104 may be configured to generate one or more control signals to cause a display device to indicate access is denied (step 712). By way of another example, the one or more controllers 104 may be configured to generate one or more control signals to cause the system 100 to alert the individual (or airport personnel), via the audio device 122, that access is denied.

In some embodiments, the one or more controllers 104 may be communicatively coupled to one or more components of an access point (e.g., gate, door, security system), such that the one or more controllers 104 may be configured to grant/deny access to the access point based on whether or not the measured body temperature is above the predetermine thresholder (or another safety protocol has been met). For example, the one or more controllers 104 may be communicatively coupled to an entry gate/door. In this example, when access is granted, the one or more controllers 104 may be configured to allow access via the entry gate/door (e.g., by unlocking the gate/door, opening the gate/door, or the like). Further, in this example, when access is denied, the one or more controllers 104 may be configured to deny access via the entry gate/door (e.g., by locking the gate/door, or the like).

Figure 8:
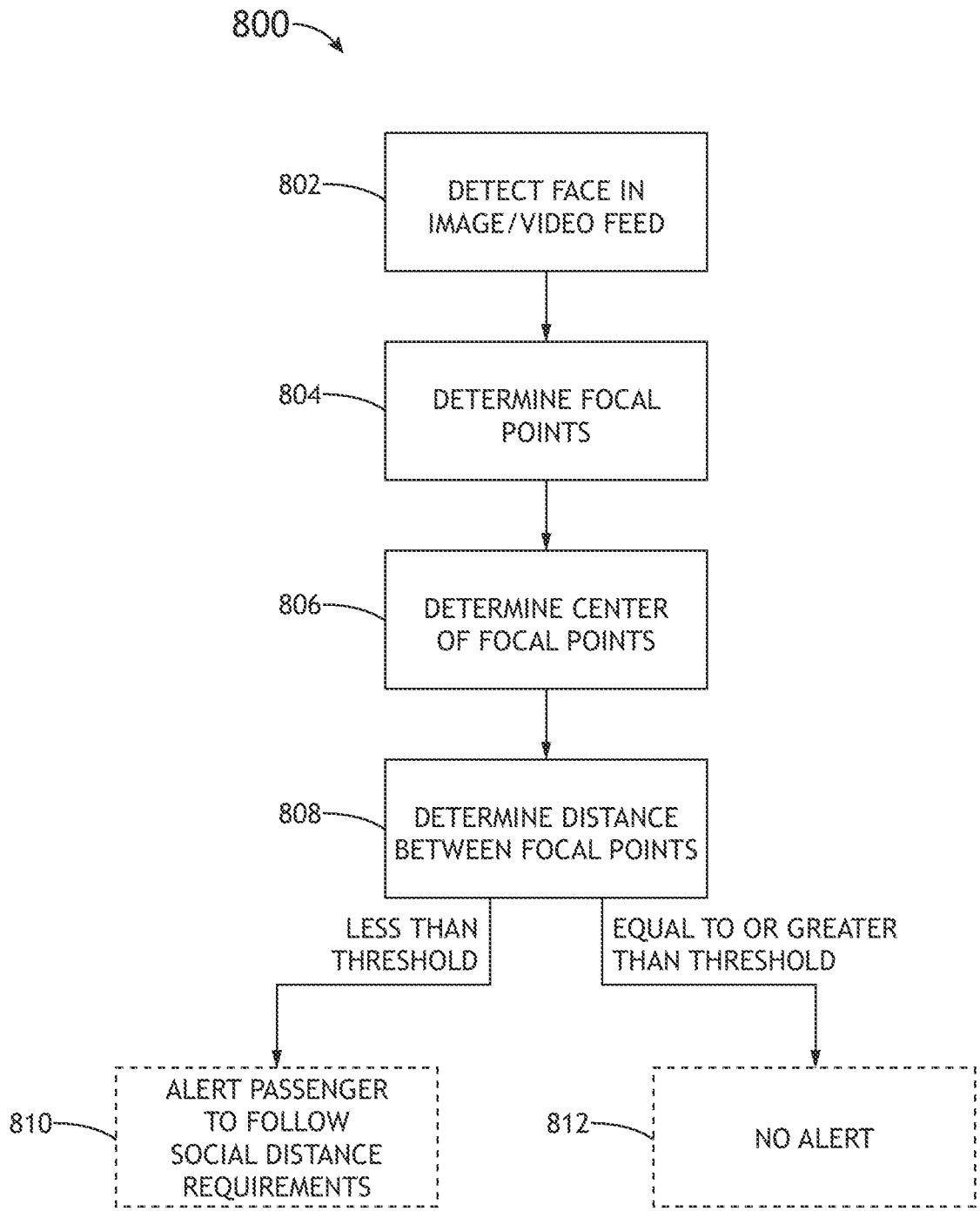
FIG. 8 illustrates a flowchart depicting a method or process for using the pre-trained system for automated social distancing detection, in accordance with one or more embodiments of the disclosure.

FIG. 8 illustrates a flowchart depicting a method or process 800 for social distancing detection, in accordance with one or more embodiments of the disclosure.

In a step 802, the system 100 may be configured to receive one or more images (or videos). For example, the one or more controllers 104 may be configured to receive one or more images (or videos) from the additional detection device 120 (e.g., the camera).

In a step 804, the system 100 may be configured to determine a plurality of focal points for each object (e.g., individual) in the one or more images (or videos). For example, the one or more controllers 104 may be configured to determine a first focal point for a first object and at least an additional focal point for an additional object within the one or more images (or videos).

In a step 806, the system 100 may be configured to determine a center of the plurality focal points. For example, the one or more controllers 104 may be configured to determine a center of the plurality of focal points.

In step 808, the system 100 may be configured to determine a distance between the center of the plurality of focal points. For example, the one or more controllers 104 may be configured to determine a distance between a first center focal point of a first object and at least an additional center focal point of an additional object.

If the distance between the focal points is less than a predetermined social distancing threshold, in a step 810, the system 100 may be configured to generate one or more control signals to cause the detection sub-system 102 to generate one or more alerts (e.g., sound alerts, visual alerts, or the like). For example, if the distance between the focal points is less than the predetermined distance (e.g., 6 feet), then the one or more controllers 104 may be configured to generate one or more control signals to cause the system 100 to alert the individual that they are not practicing proper social distancing requirements.

If the distance between the focal points is above a predetermined social distancing threshold, in a step 812, the system 100 may be configured to not generate an alert.

Although one or more embodiments of the present disclosure are directed to an airline kiosk system and method for monitoring the adherence of safety protocols in the airport, it is noted herein that the system and method may be directed for monitoring the adherence of safety protocols in any environment (e.g., grocery store, restaurants, mall, concerts, office buildings, train station, gas station, rest stations, school buildings, daycare facilities, hospitals, doctor offices, or the like).

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A system for automated safety protocol detection, comprising:

a detection sub-system comprising one or more detection devices configured to capture at least one of one or more images or one or more videos of one or more passengers; and one or more controllers communicatively coupled to the detection sub-system, the one or more controllers including one or more processors configured to execute a set of program instructions stored in a memory, the one or more controllers including a pre-trained detection model stored in the memory, the set of program instructions configured to cause the one or more processors to:

receive the at least one of the one or more images or the one or more videos from the one or more detection devices of the detection sub-system;

measure a body temperature of a passenger of the one or more passengers using a first detection device of the one or more detection devices;

perform face mask detection based on the pre-trained mask detection model and the received at least one of the one or more images or the one or more videos using an additional detection device of the one or more detection devices; and perform social distancing detection based on the received at least one of the one or more images or the one or more videos using the additional detection device of the one or more detection devices, the perform social distancing comprising:

determining a first focal plane of a passenger based on the received at least one of the one or more images or the one or more videos;

determining an additional focal place an additional passenger based on the received at least one of the one or more images or the one or more videos;

calculating the distance between the first focal plane and the additional focal plane; and generating one or more control signals based on the calculated distance; and generate one or more control signals based on the measured body temperature and the performed face mask detection, the one or more control signals configured to cause the detection sub-system to grant access when the measured body temperature is at or below a predetermined body temperature threshold or configured to cause the detection sub-system to deny access when the measured body temperature is above the predetermined body temperature threshold, the one or more control signals configured to cause the detection sub-system to grant access when the pre-trained mask detection model detects the passenger wearing a face mask over a passenger's nose and a passenger's chin or configured to cause the detection sub-system to deny access when the pre-trained mask detection model detects the passenger not wearing the face mask over the passenger's nose and the passenger's chin.

2. The system of claim 1, wherein the perform face mask detection based on the pre-trained mask detection model and the received at least one of the one or more images or the one or more videos using an additional detection device of the one or more detection devices, comprises:

extracting one or more face regions of interest from the received at least one of the one or more images or the one or more videos;

applying a mask classifier of the pre-trained detection model to determine whether the passenger is wearing the face mask; and applying the mask classifier of the pre-trained detection model to determine whether the passenger is wearing the face mask over the passenger's nose and chin.

3. The system of claim 2, wherein the one or more face regions of interest include at least one of:

a first eye region, a second eye region, a first lip region, a second lip region, or a nose region.

4. The system of claim 1, further comprising:

one or more audio devices.

5. The system of claim 4, wherein the one or more control signals are configured to cause the one or more audio devices to play an alert if the calculated distance is below a predetermined social distancing threshold.

6. The system of claim 5, wherein the predetermined social distancing threshold is 6 feet.

7. The system of claim 1, wherein the first detection device includes a thermal imaging device.

8. The system of claim 1, wherein the additional detection device includes a camera.

9. The system of claim 1, wherein a controller of the one or more controllers is integrated into the detection sub-system.

10. The system of claim 9, wherein the detection sub-system is a kiosk.

11. The system of claim 1, wherein a controller of the one or more controllers is external to the detection sub-system.

12. The system of claim 1, wherein the predetermined body temperature threshold is 100° F.

13. A method for automated safety protocol detection, comprising:

receiving at least one of one or more images or one or more videos from one or more detection devices;

measuring a body temperature of a passenger using a first detection device of the one or more detection devices;

performing face mask detection based on a pre-trained mask detection model of a detection sub-system and the received at least one of the one or more images or the one or more videos using an additional detection device of the one or more detection devices;

performing social distancing detection based on the received at least one of the one or more images or the one or more videos using the additional detection device of the one or more detection devices, the performing social distancing comprising:

determining a first focal plane of a passenger based on the received at least one of the one or more images or the one or more videos;

determining an additional focal place an additional passenger based on the received at least one of the one or more images or the one or more videos;

calculating the distance between the first focal plane and the additional focal plane; and generating one or more control signals based on the calculated distance; and generating one or more control signals based on the measured body temperature and the performed face mask detection, the one or more control signals configured to cause the detection sub-system to grant access when the measured body temperature is at or below a predetermined body temperature threshold or configured to cause the detection sub-system to deny access when the measured body temperature is above the predetermined body temperature threshold, the one or more control signals configured to cause the detection sub-system to grant access when the pre-trained mask detection model detects the passenger wearing a face mask over a passenger's nose and a passenger's chin or configured to cause the detection sub-system to deny access when the pre-trained mask detection model detects the passenger not wearing the face mask over the passenger's nose and the passenger's chin.

\* \* \* \* \*